(12) United States Patent
Lofstrom et al.

(10) Patent No.: US 11,161,627 B2
(45) Date of Patent: Nov. 2, 2021

(54) BOND FIXTURE FOR SHEATH ASSEMBLY OF ROTOR BLADE

(71) Applicant: Sikorsky Aircraft Corporation, Stratford, CT (US)

(72) Inventors: Sven Roy Lofstrom, Irving, TX (US); David Littlejohn, Haslet, TX (US); Eric Boyle, Haslet, TX (US); Scott Oren Smith, Bedford, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 180 days.

(21) Appl. No.: 16/374,578

(22) Filed: Apr. 3, 2019

(65) Prior Publication Data

US 2019/0225329 A1    Jul. 25, 2019

Related U.S. Application Data

(62) Division of application No. 15/232,319, filed on Aug. 9, 2016, now Pat. No. 10,287,008.

(51) Int. Cl.
*B64F 5/10* (2017.01)
*B64C 27/473* (2006.01)
*B29C 73/24* (2006.01)

(52) U.S. Cl.
CPC .............. *B64F 5/10* (2017.01); *B64C 27/473* (2013.01); *B29C 73/24* (2013.01)

(58) Field of Classification Search
CPC .......... B64F 5/10; B64C 27/473; B29C 73/24
See application file for complete search history.

(56) References Cited

U.S. PATENT DOCUMENTS

| | | | |
|---|---|---|---|
| 3,607,545 A | 9/1971 | Parsons et al. | |
| 4,855,011 A | 8/1989 | Legge et al. | |
| 5,862,576 A | 1/1999 | Leahy et al. | |
| 5,908,522 A | 6/1999 | Lofstrom et al. | |
| RE37,774 E | 7/2002 | Leahy et al. | |
| 8,409,389 B2 * | 4/2013 | Jones | B29C 70/887 156/245 |
| 8,552,347 B2 * | 10/2013 | Boschet | B29C 66/80 219/603 |
| 8,840,750 B2 * | 9/2014 | Parkin | F01D 5/286 156/307.1 |
| 9,138,971 B2 | 9/2015 | Jones | |
| 9,144,944 B1 | 9/2015 | White | |
| 2015/0190893 A1 * | 7/2015 | Parkin | B23P 15/04 416/224 |
| 2018/0044039 A1 | 2/2018 | Lofstrom et al. | |

* cited by examiner

*Primary Examiner* — Moshe Wilensky
(74) *Attorney, Agent, or Firm* — Foley & Lardner LLP

(57) ABSTRACT

A bond fixture includes a first fixture having a heater and a plurality of clamps. Each of the plurality of clamps includes a first member and a second member rotatable between a first position and a second position. A second fixture includes a root end lift translatable vertically between a retracted position and an extended position and a root end clamp translatable along a horizontal axis. The root end clamp is configured to cooperate with the root end.

6 Claims, 14 Drawing Sheets

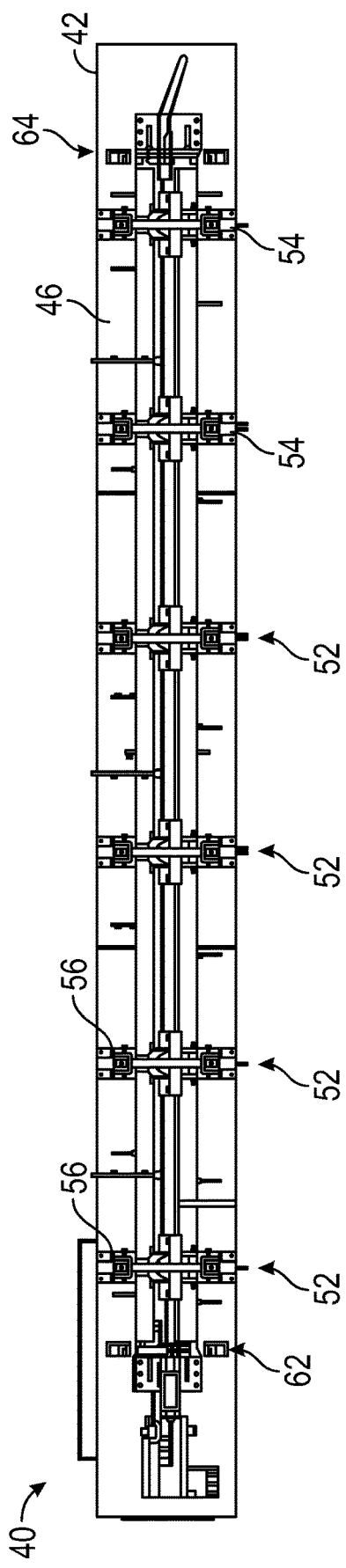
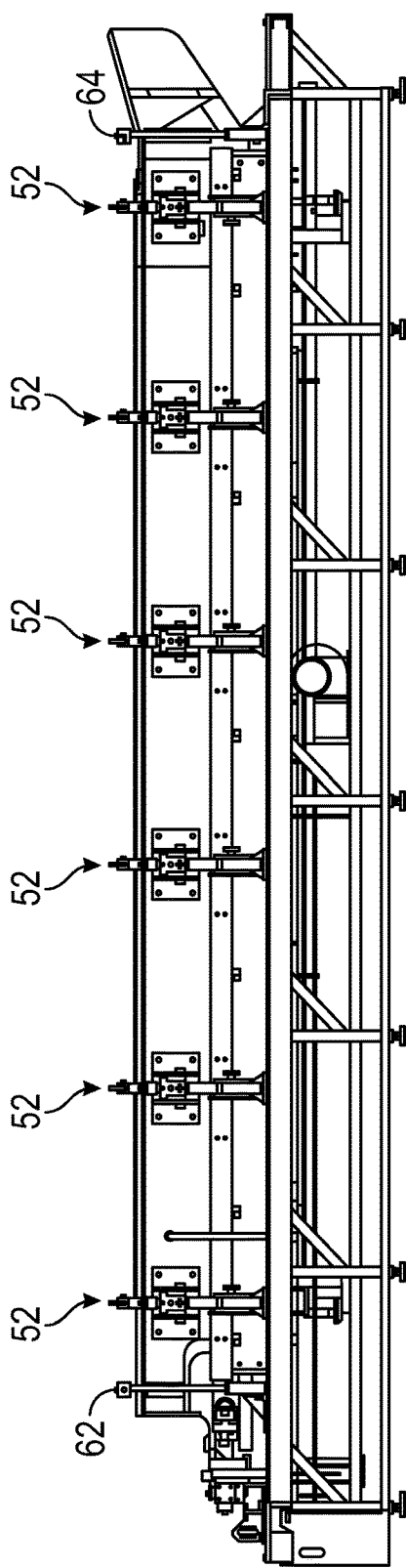
FIG. 5A
FIG. 5B

BOND FIXTURE FOR SHEATH ASSEMBLY OF ROTOR BLADE

CROSS REFERENCE TO RELATED APPLICATIONS

This application is a divisional of U.S. application Ser. No. 15/232,319, filed Aug. 9, 2016, which is hereby incorporated by reference in its entirety into this application.

BACKGROUND OF THE INVENTION

Exemplary embodiments of the invention relate to a rotary-wing aircraft and, more particularly, to a bond fixture for use during the manufacture or repair of a rotor blade of a rotary-wing aircraft.

Rotary wing aircraft include a plurality of main rotor blades coupled to a central hub. The rotor blades include aerodynamic surfaces that, when rotated, create lift. The configuration of the main rotor blades, particularly the leading edge thereof, is selected to enhance rotor blade performance, for example to increase the hover and lift capabilities of the rotary-wing aircraft. Rotor blades are subjected to high stresses and strains resulting from aerodynamic forces developed during operation.

BRIEF DESCRIPTION OF THE INVENTION

According to one embodiment of the invention, a bond fixture includes a first fixture having a heater and a plurality of clamps. Each of the plurality of clamps includes a first member and a second member rotatable between a first position and a second position. A second fixture includes a root end lift translatable vertically between a retracted position and an extended position and a root end clamp translatable along a horizontal axis. The root end clamp is configured to cooperate with the root end.

In addition to one or more of the features described above, or as an alternative, in further embodiments the heater includes a plurality of regions, and heat output at each of the plurality of regions is substantially identical.

In addition to one or more of the features described above, or as an alternative, in further embodiments the heater includes a plurality of regions, and heat output from at least one of the plurality of regions varies.

In addition to one or more of the features described above, or as an alternative, in further embodiments the plurality of clamps are equidistantly spaced.

In addition to one or more of the features described above, or as an alternative, in further embodiments each of the first member and second member includes a pad configured to contact a component receivable between the first member and the second member.

In addition to one or more of the features described above, or as an alternative, in further embodiments at least one of the pads associated with each clamp is movable relative to the first member and the second member.

In addition to one or more of the features described above, or as an alternative, in further embodiments the component is a rotor blade.

In addition to one or more of the features described above, or as an alternative, in further embodiments at least one of the first members of each of the plurality of clamps and the second members of each of the plurality of clamps is configured to move in unison.

According to another embodiment, a method of bonding a sheath assembly laminate to a rotor blade includes installing the sheath assembly laminate about the rotor blade, mounting the rotor blade with a bond fixture, and applying localized and constant heat and pressure to the sheath assembly laminate.

In addition to one or more of the features described above, or as an alternative, in further embodiments mounting the rotor blade within the bond fixture includes moving a plurality of clamps into engagement with the rotor blade.

In addition to one or more of the features described above, or as an alternative, in further embodiments moving the plurality of clamps includes pivoting a first member and a second member into contact with a surface of the rotor blade.

In addition to one or more of the features described above, or as an alternative, in further embodiments mounting the rotor blade within bond fixture includes moving a root end lift vertically between an extended position and a retracted position.

In addition to one or more of the features described above, or as an alternative, in further embodiments mounting the rotor blade within the bond fixture includes positioning a root end clamp within a hollow interior of a blade cuff of the rotor blade.

In addition to one or more of the features described above, or as an alternative, in further embodiments constant pressure is applied to the rotor blade via a vacuum bag.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5a is a top view of a bond assembly for bonding a sheath assembly to a leading edge of a rotor blade according to an embodiment;

FIG. 5b is another side view of a bond assembly for bonding a sheath assembly to a leading edge of a rotor blade according to an embodiment;

The detailed description explains embodiments of the invention, together with advantages and features, by way of example with reference to the drawings.

DETAILED DESCRIPTION OF THE INVENTION

Figure 1:
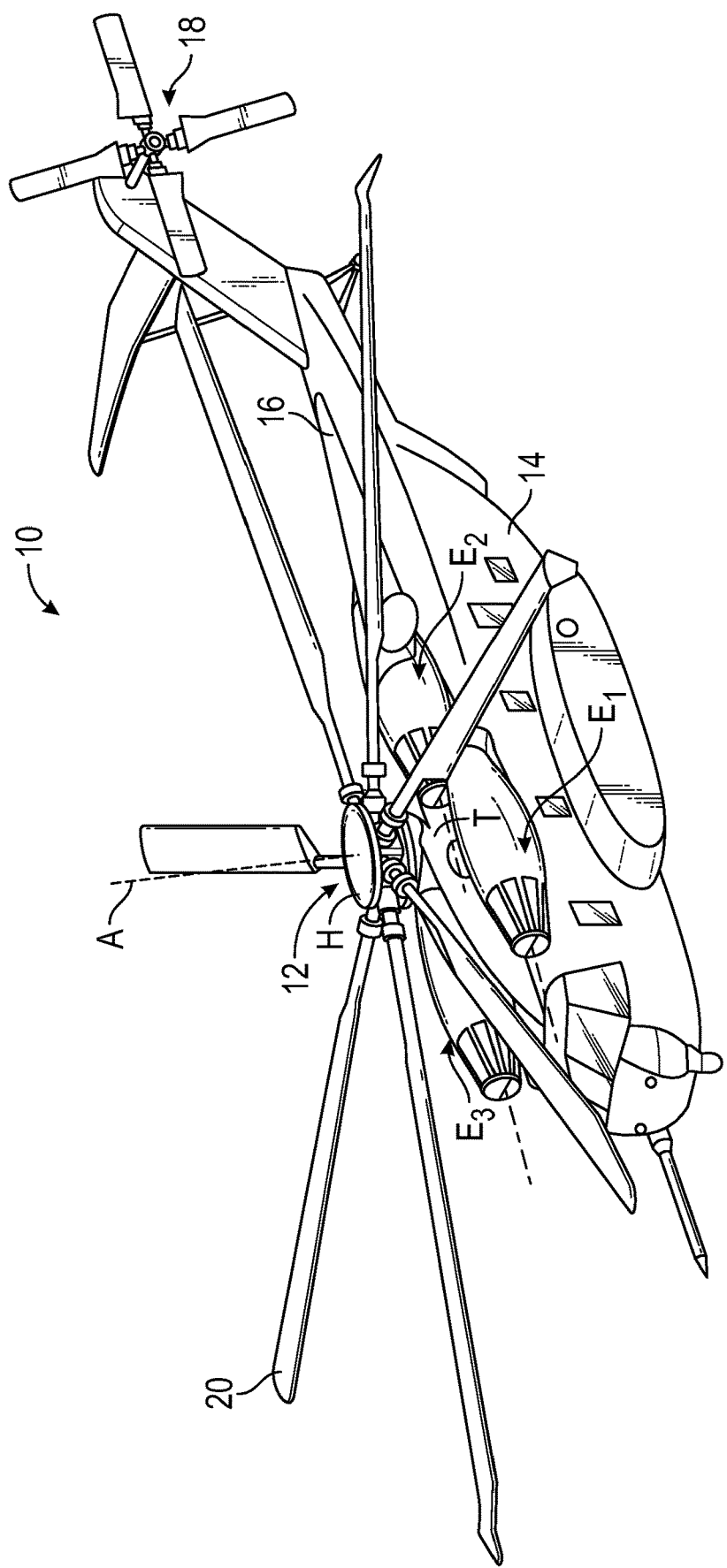
FIG. 1 is a perspective view of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system for example. The main rotor assembly 12 is driven about an axis of rotation A through a main gearbox (illustrated schematically at T) by one or more engines E. The main rotor system 12 includes a plurality of rotor blade assemblies 20 mounted to a rotor hub assembly H. Although a particular helicopter configuration is illustrated and described in the disclosed non-limiting embodiment, other configurations and/or machines, such as high speed compound rotary-wing aircraft with supplemental translational thrust systems, dual contra-rotating, coaxial rotor system aircraft, turbo-props, tilt-rotors, and tilt-wing aircraft are also within the scope of the invention.

Figure 2:
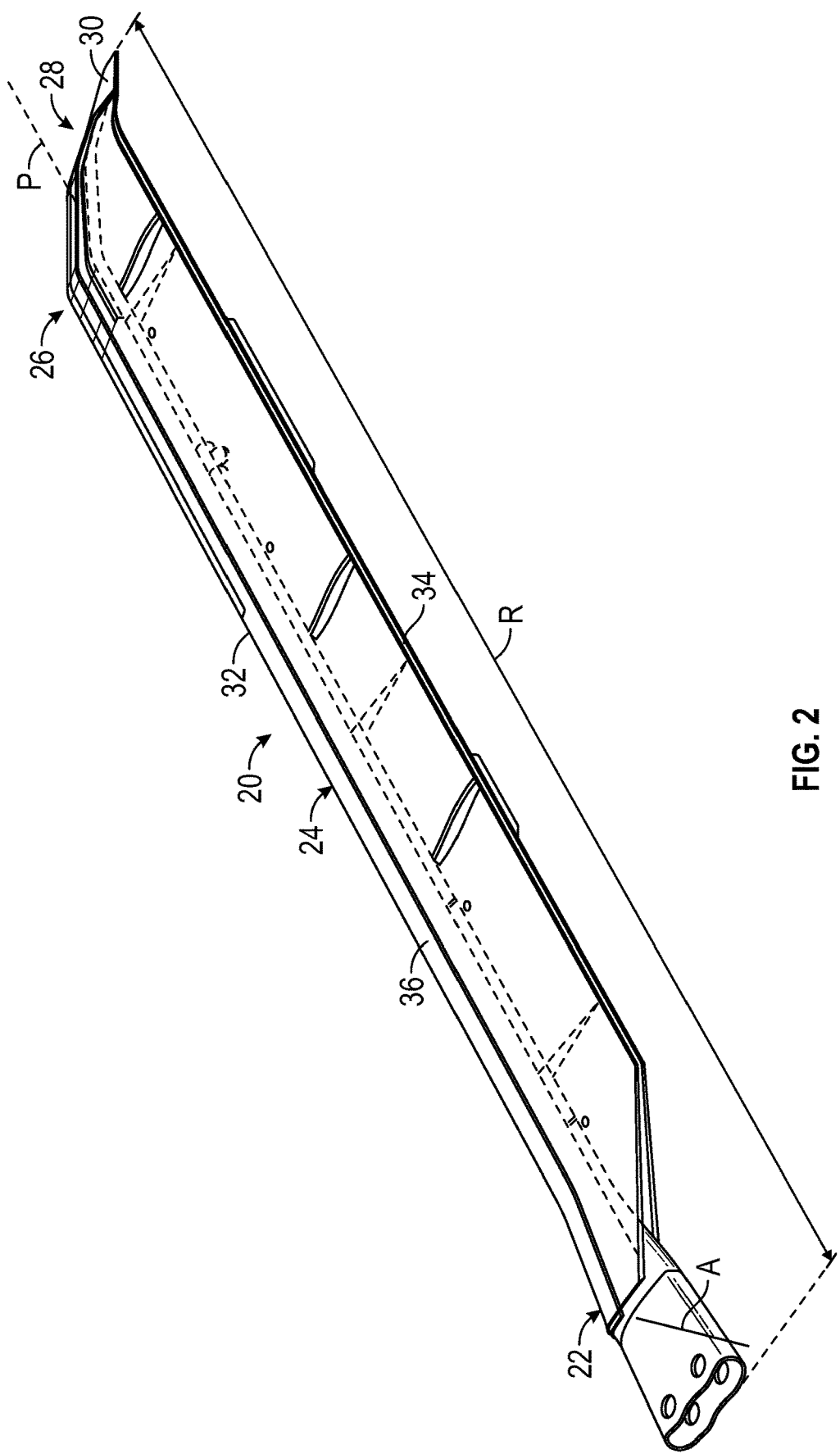
FIG. 2 is a perspective view of an example of a rotor blade of a rotary wing aircraft.
Figure 3:
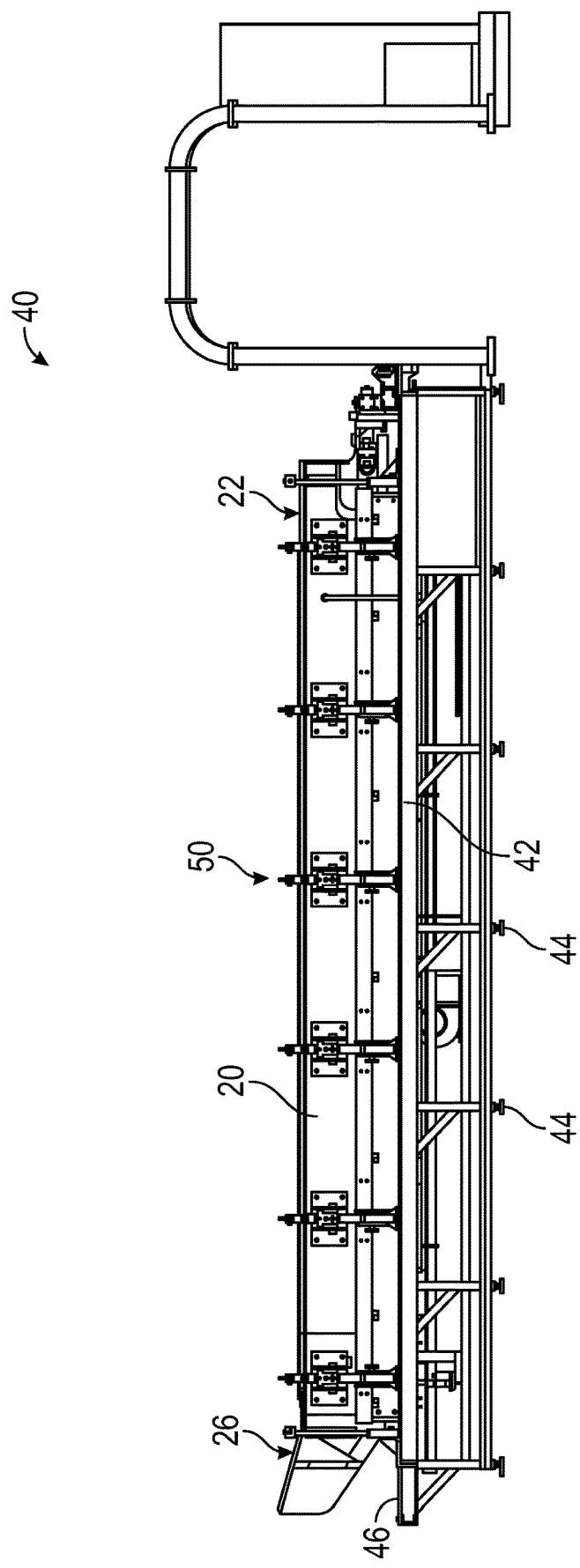
FIG. 3 is a side view of a bond assembly for bonding a sheath assembly to a leading edge of a rotor blade according to an embodiment.
Figure 4:
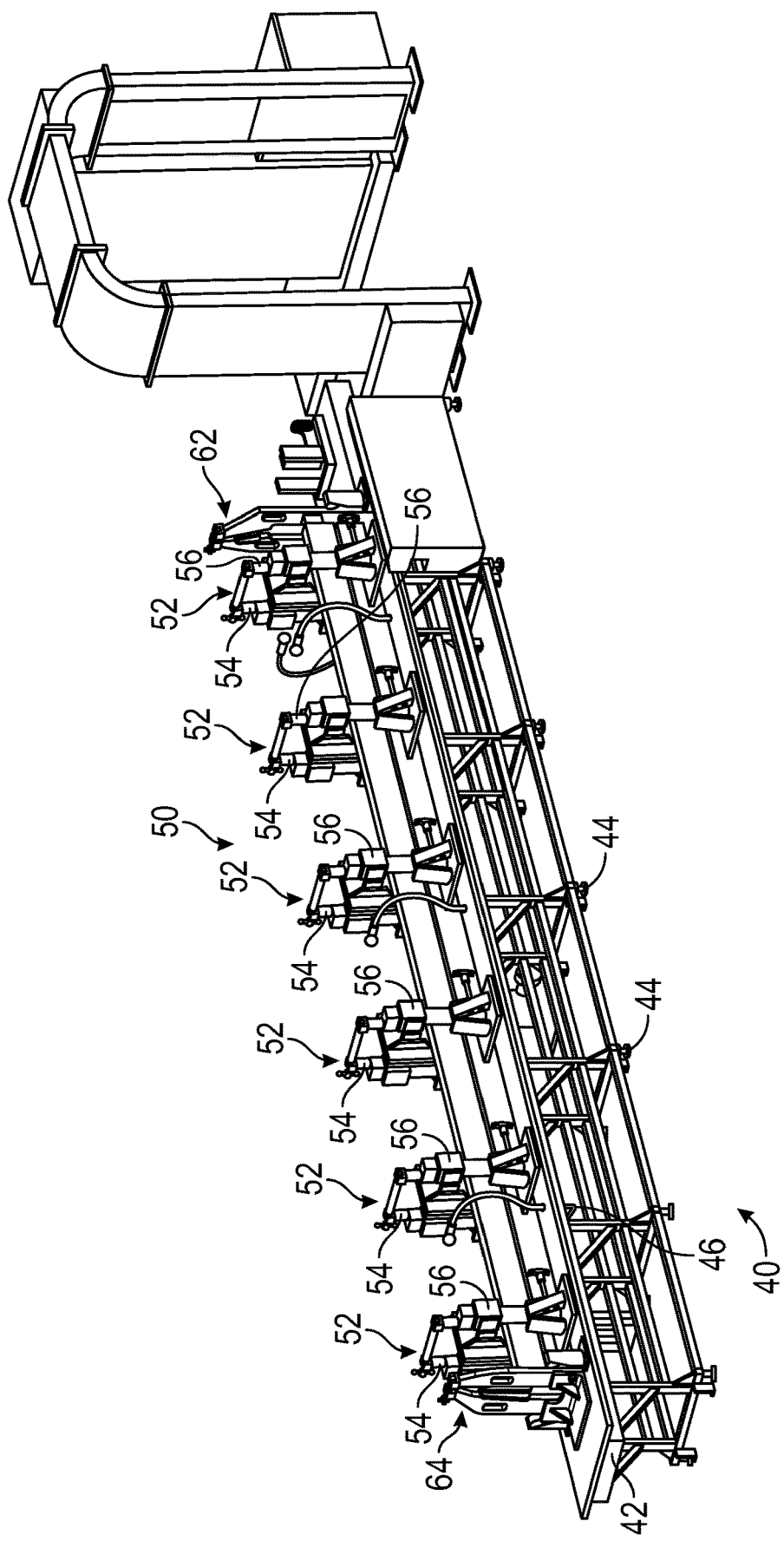
FIG. 4 is a perspective view of a bond assembly for bonding a sheath assembly to a leading edge of a rotor blade according to an embodiment.

Referring to FIG. 2, each rotor blade assembly 20 of the rotor assembly 12 generally includes a root section 22, an intermediate section 24, a tip section 26, and a tip cap 28. Each rotor blade section 22, 24, 26, 28 may define particular airfoil geometries to tailor the rotor blade aerodynamics to the velocity increase along the rotor blade span. As, illustrated, the rotor blade tip section 26 may include an anhedral form (not shown); however, a tip section having any angled or non-angled form such as cathedral, gull, bent, and other non-straight forms are also contemplated herein.

The rotor blade ions 22-28 define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34. The distance between the leading edge 32 and the trailing edge 34 defines a main element chord length Cm. As shown in FIG. 2, a sheath assembly 36 is positioned about the leading edge 32 of the rotor blade 20, and extends from the root section 22 to the tip section 26.

With reference now to FIGS. 3-13, an example of a bonding assembly 40 for bonding the sheath assembly 36 to the leading edge 32 of the rotor blade 20 is illustrated. As shown, the bond assembly 40 includes a table 42 having a plurality of feet 44 configured to rest on or couple to a floor with one or more fasteners (not shown). An upper surface 46 of the table 42 is arranged generally level to the floor, such as at an ergonomic height for example.

A fixture 50 is attached to the table 42 and is configured to receive the rotor blade 20 therein such that the leading edge 32 of the rotor blade 20 is positioned closest to the upper surface 46 of the table 42. The fixture 50 is generally equal in length to the span of the rotor blade 20 extending from the root end 22 to the tip section 26. The fixture 50 includes a plurality of clamps 52, each of which has a first member 54 and a corresponding second member 56 arranged opposite one another about the table 42. In the illustrated, non-limiting embodiment, the fixture 50 includes six clamps 52; however embodiments having any number of clamps 52 are within the scope of the disclosure. The first and second members 54, 56 are configured to cooperate in a manner similar to a clamp or vice to grip the rotor blade 20.

Figure 6:
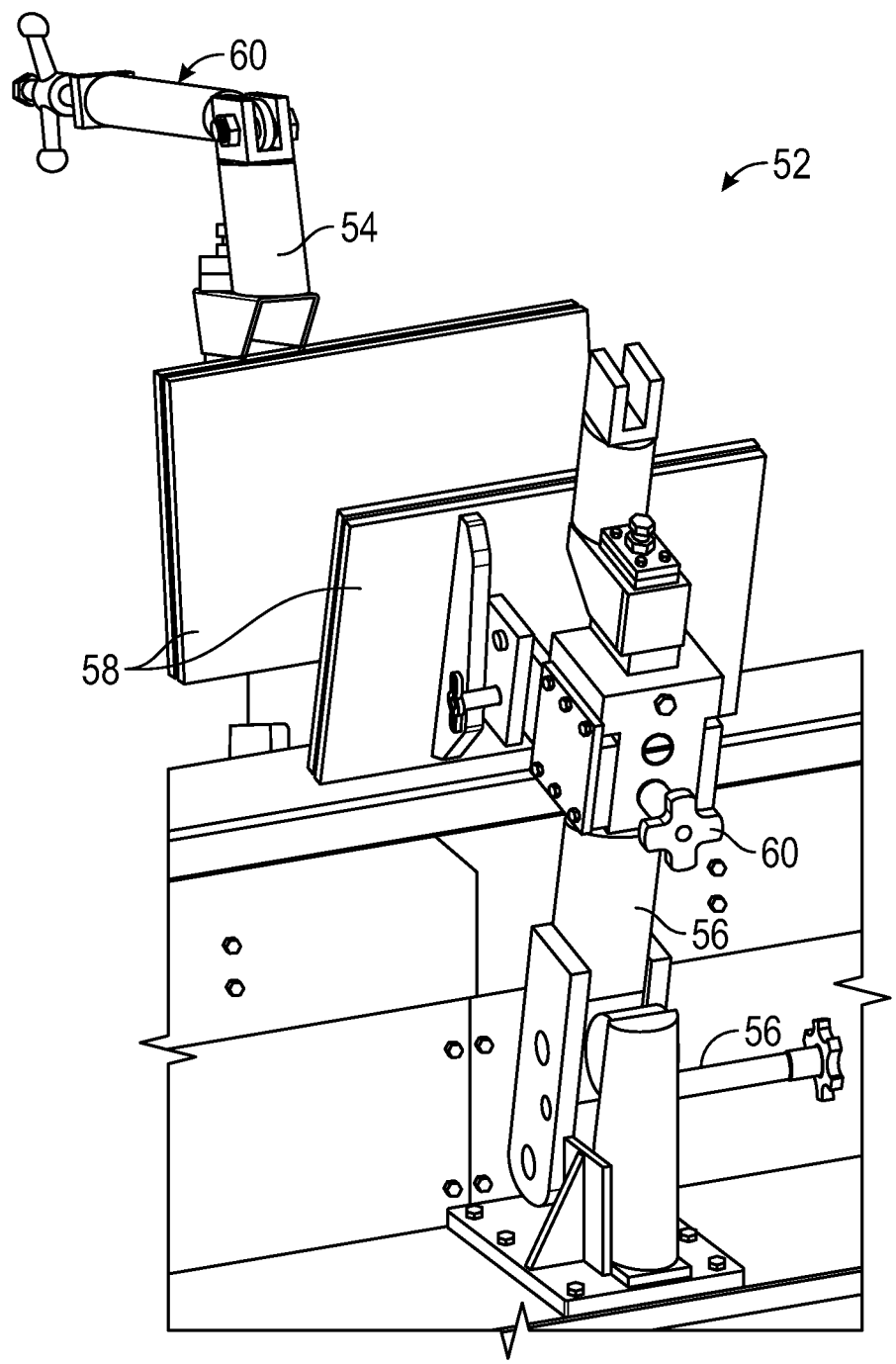
FIG. 6 is a perspective view of a clamp of the bond assembly according to an embodiment.

An example of a clamp 52 is shown in more detail in FIG. 6. The first and second members 54, 56 are pivotable relative to the table 42 to move the members 54, 56 into and out of engagement with an adjacent surface of the rotor blade 20. As shown, each of the first and second members 54, 56 includes a plate, pad, or other contactor 58 having an enlarged surface area relative to the members 54, 56. As the first and second members 54, 56 are rotated into contact with a rotor blade 20, the contactor 58 mounted thereto are configured to engage and distribute the pressure applied to the rotor blade 20 across a greater surface, thereby avoiding damage to the rotor blade 20. Once the first and second members 54, 56 are rotated into engagement with the rotor blade 20, a connector 60 (FIG. 7) may be used to couple the members 54, 56 together, such as at their free ends for example, to restrict them from pivoting out of the engaged position and away from the rotor blade 20. The plurality of first members 54 and the plurality of second members 56 may be operated in unison, or alternatively, may be moved in and out of engagement with a rotor blade 20 individually.

Figure 7:
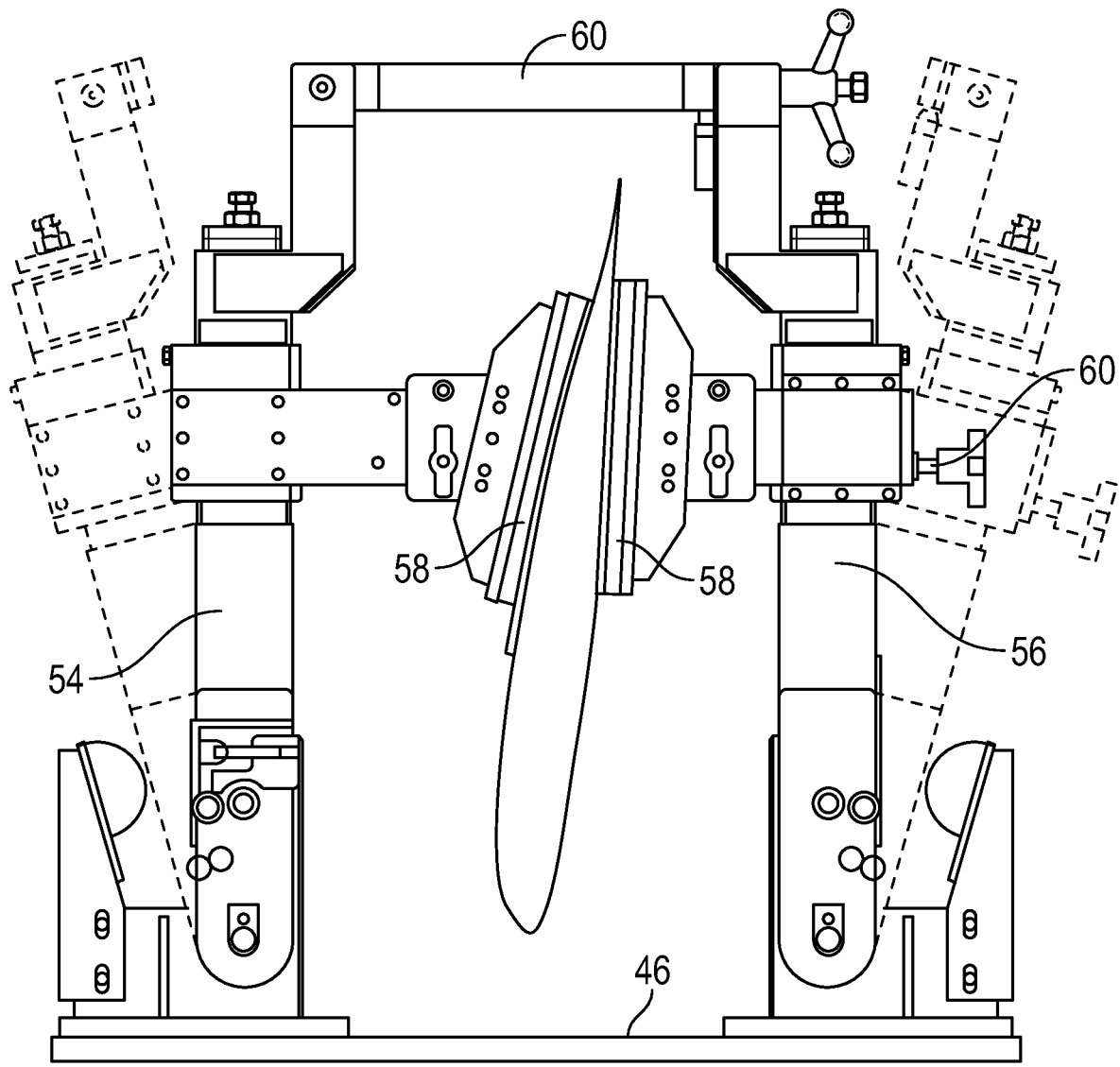
FIG. 7 is an end view of a clamp of the bond assembly according to an embodiment.
Figure 7A:
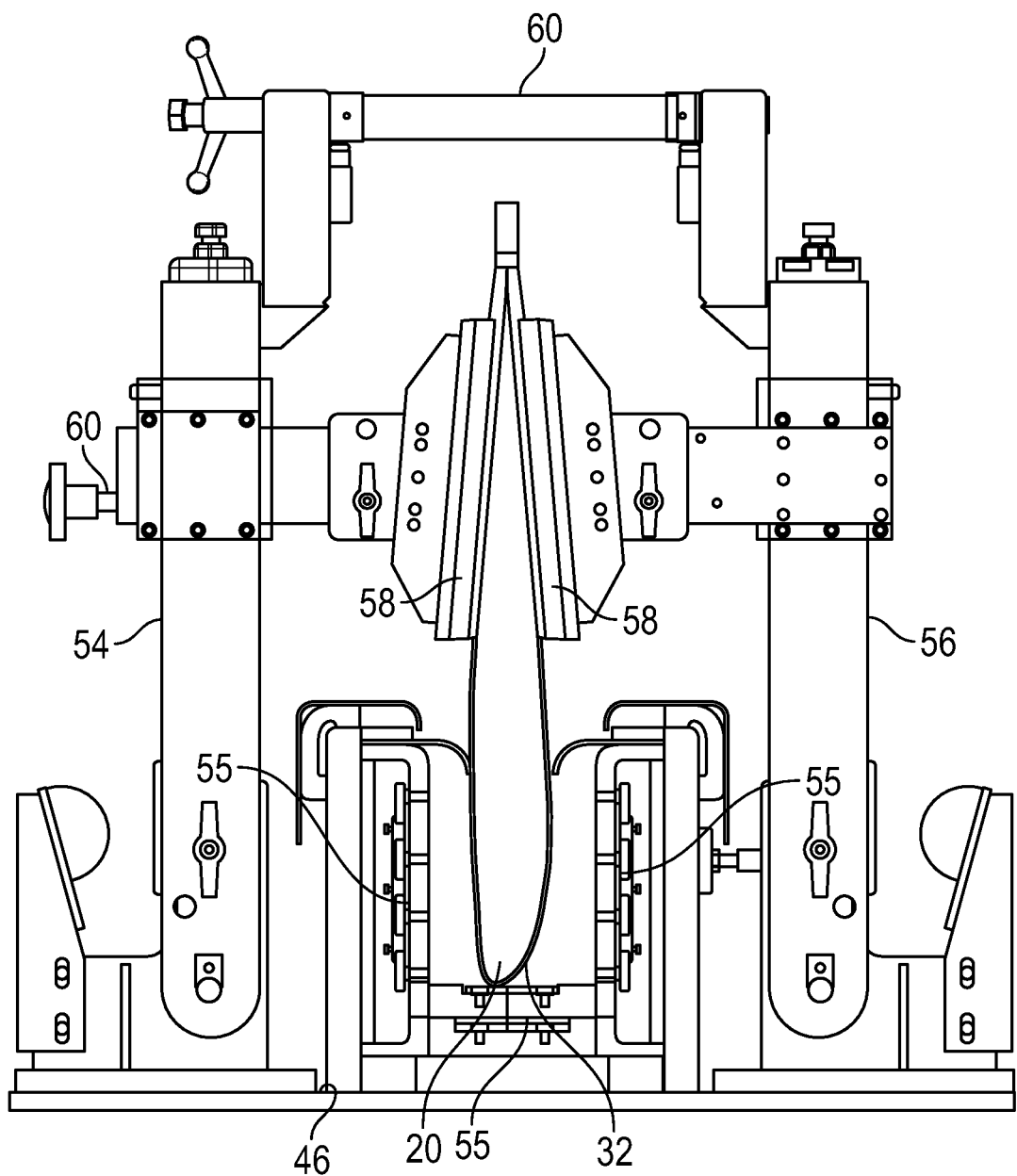
FIG. 7a is an end view of a clamp of the bond assembly according to an embodiment.
Figure 9:
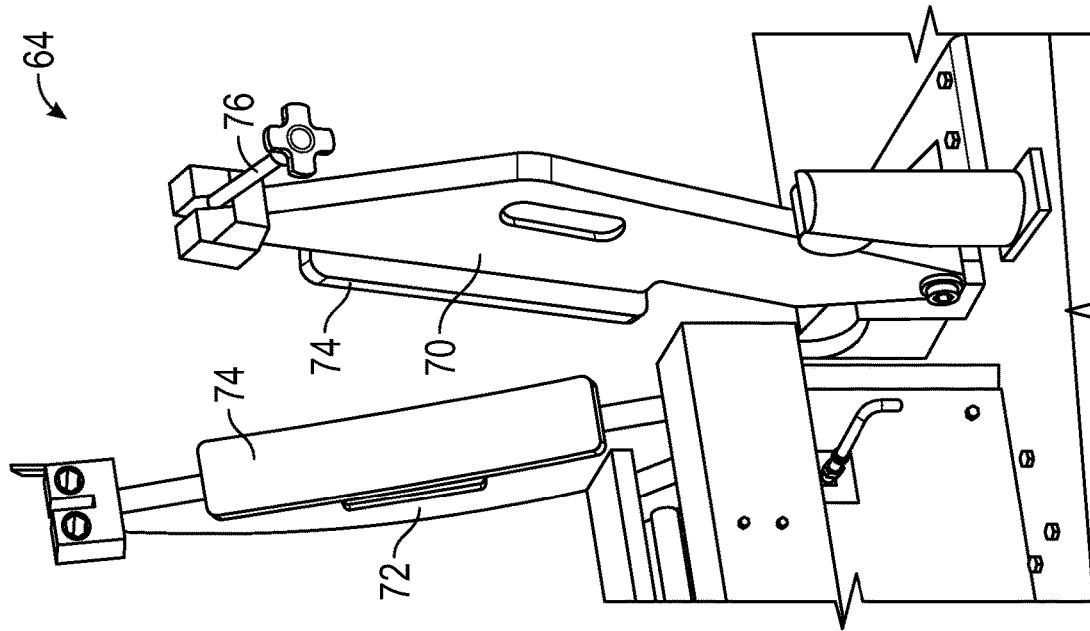
FIG. 9 is a perspective view of a tip end clamp of the bond assembly according to an embodiment.
Figure 8:
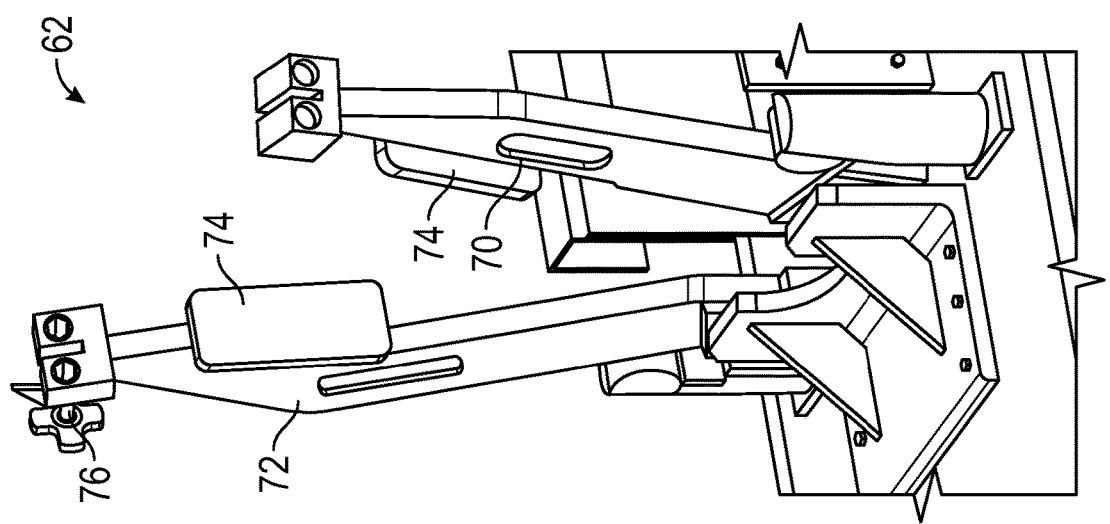
FIG. 8 is a perspective view of a root end clamp of e bond assembly according to an embodiment.
Figure 10:
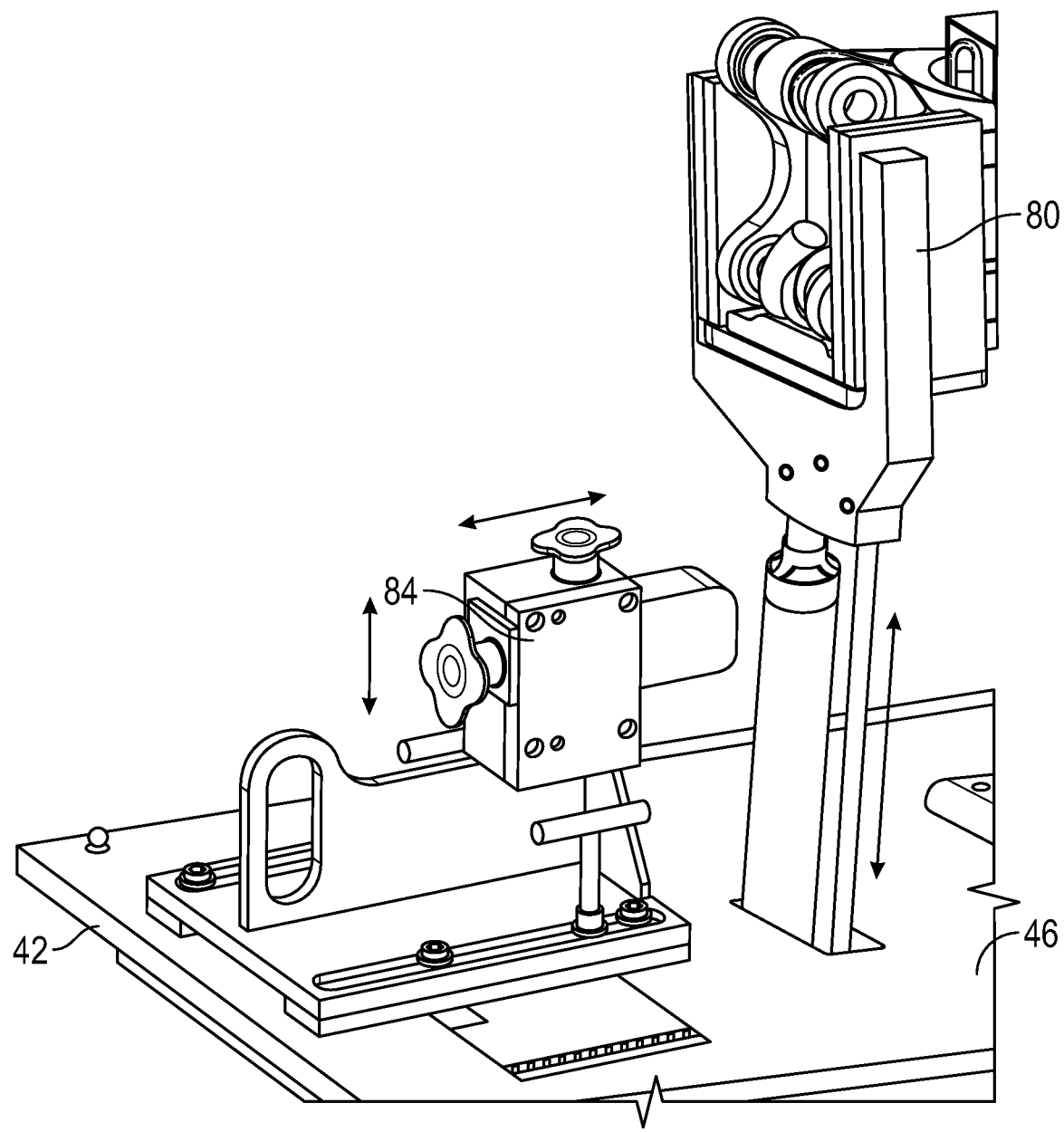
FIG. 10 is a perspective view of the bond assembly at the root end of the rotor blade according to an embodiment.

In an embodiment, at least one strip heater 55 (FIG. 7A) extends over the span of the rotor blade 20 between the plurality of first members 54 and/or the plurality of second members 56. The strip heater 55 includes one or more heating elements (not shown) configured to generate the heat necessary for the bonding process. Depending on the construction of the heating element, the heat output from the strip heater 55 may be constant, or may vary across at least one of the span and the chord of the rotor blade 22. In an embodiment, the strip heater 55 includes a plurality of regions or zones to accommodate variations in thermal cycling and ensure even heating across the rotor blade 20 during the adhesive cure. In an embodiment, best shown in FIG. 7A, the heater 55 does not directly contact a surface of the rotor blade 20, but rather warms the air arranged within the gap between the rotor blade and the heater 55. A control cabinet controls power output to a single heater element or multi-zoned heater elements.

At least a portion of the contactor 58 may be movably mounted to the members 54, 56. In an embodiment, the contactors 58 mounted to each of the second members 56 are movable relative thereto. For example, the contactor 58 may be connected to each of the members 54, 56 with a threaded fastener 60 such that rotation of the threaded fastener 60 about an axis causes the contactor 58 to translate along the axis. In such embodiments, rotation of the threaded fastener 60 may be used to adjust the pressure applied by each of the contactors 58 to the rotor blade 20. Alternatively, or in addition, the contactor 58 may be pivotally mounted to the members 54, 56, such that the contactor 58 is rotatable about at least one axis of rotation. In an embodiment, the at least one axis may extend perpendicular to the members 54, 56, such as parallel or perpendicular to the span of the rotor blade 20 for example, such that the contactor 58 may rotate to maximize contact with the rotor blade 20.

In an embodiment, the fixture 50 may additionally include at least one of a root end cuff clamp 62 and a tip end clamp 64. The root end clamp 62 is positioned at the root section 22 of the rotor blade 20 between a blade cuff 66 and the plurality of clamps 52, and the tip end clamp 64 is positioned at the tip section 26 of the rotor blade 20 between the plurality of clamps 52 and the tip cap 28 of the rotor blade 20. The root end and tip end clamps 62, 64 may be similar and include a complementary first member 70 and second member 72 mounted on opposite sides of the rotor blade 20 such that the members 70, 72 cooperate to clamp a rotor blade 20. The first and second members 70, 72 may similarly include a pad or other contactor 74 configured to distribute the pressure applied by the member 70, 72 across the surface of the rotor blade 20. In the non-limiting embodiment illustrated, the first member 70 and the second member 72 are threadably coupled together by a fastener 76. However, it should be understood that other types of connections may be used.

Figure 11:
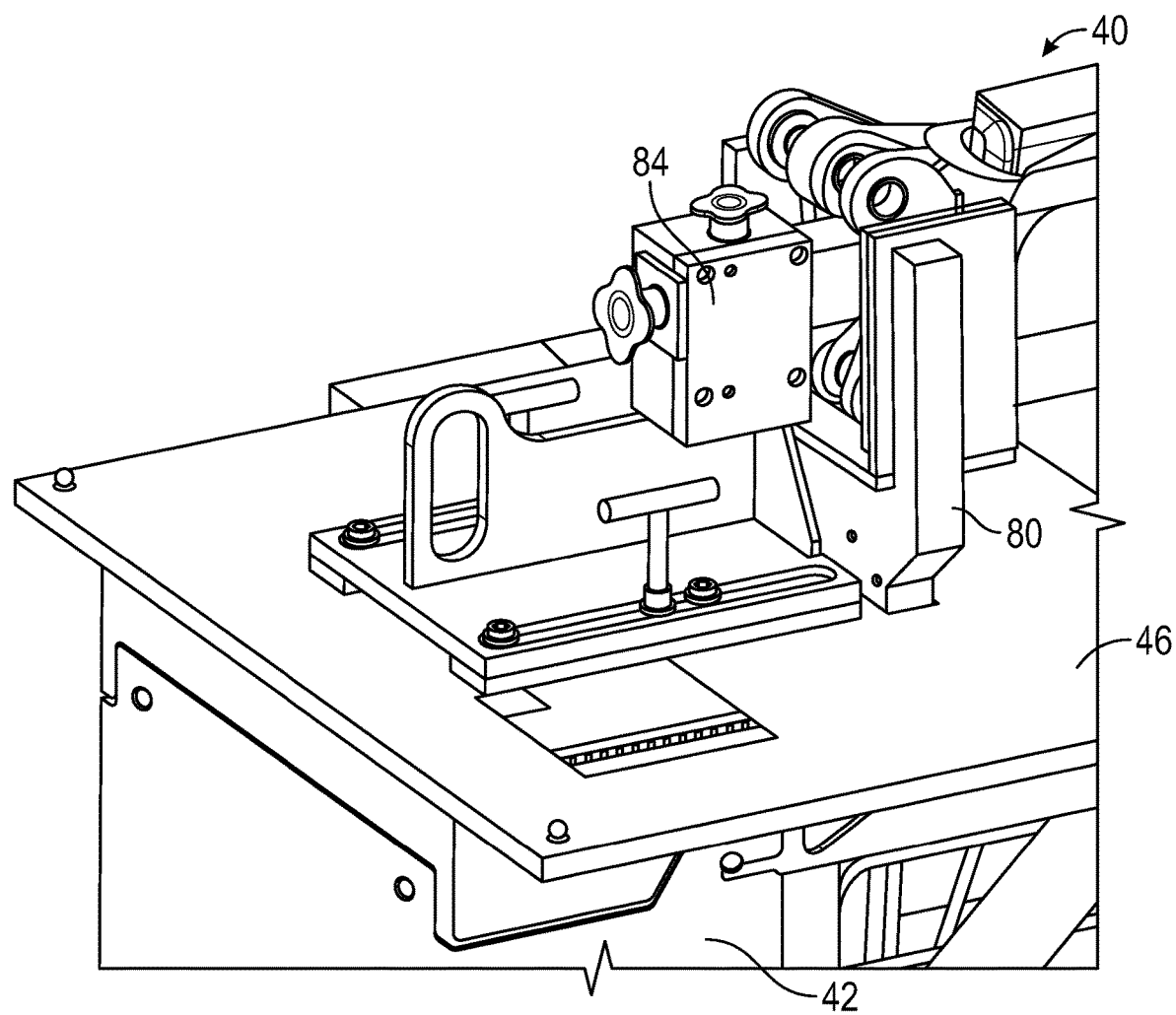
FIG. 11 is another perspective view of the bond assembly at the root end of the rotor blade according to an embodiment.
Figure 12:
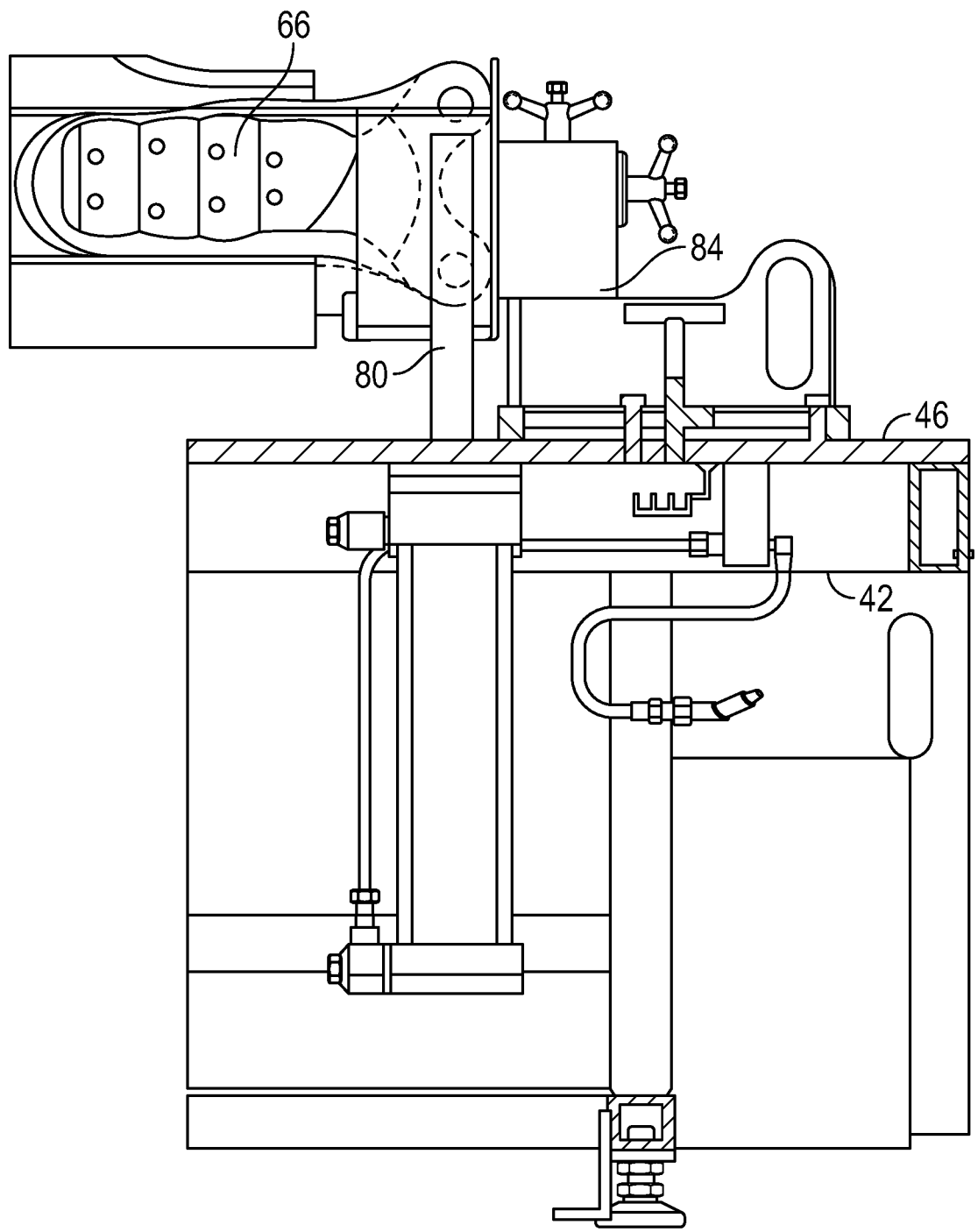
FIG. 12 is a side view of the bond assembly at the root end of the rotor blade according to an embodiment.
Figure 13:
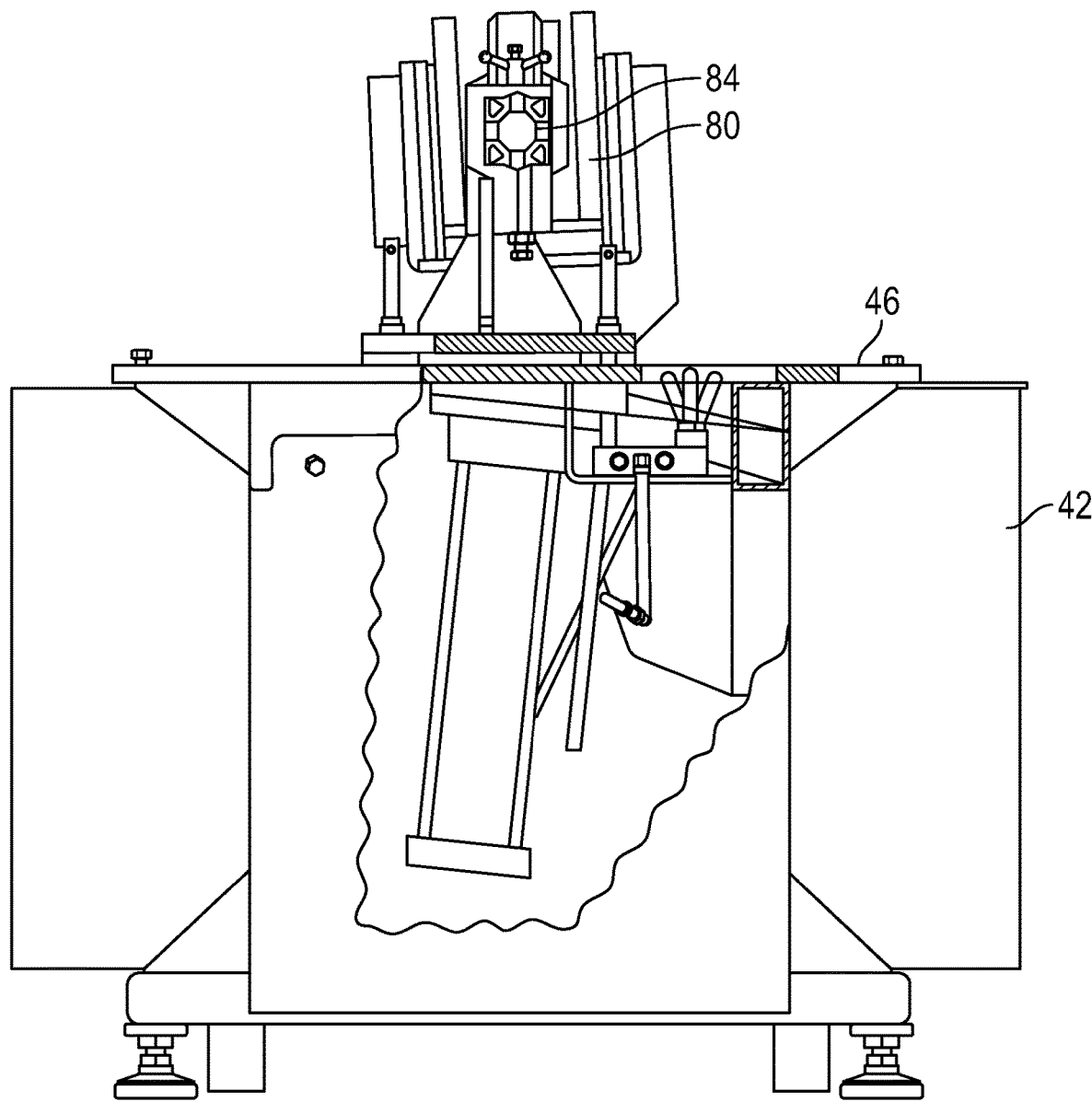
FIG. 13 is a front view of the bond assembly at the root end of the rotor blade according to an embodiment.

With reference now to FIGS. 10-13, the bond assembly 40 additionally includes a second fixture comprising a root end lift 80 configured to receive the blade cuff 66 of the rotor blade 20. The root end lift 80 is mounted to the table 42 and is configured to translate along an axis between an extended position (FIG. 10) and a retracted position (FIG. 11). In an embodiment, movement of the root end lift 80 is pneumatically or hydraulically driven. A root end clamp 84 is configured to cooperate with the root end lift 80 when in the retracted position. The root end clamp 84 is configured to translate along an axis parallel to the span of the rotor blade 20 and is additionally movable along a vertical axis. The root end clamp 84 is provided with these means of adjustment for insertion into the blade cuff 66 of the rotor blade 20 once the root end lift 80 is in the retracted position. The root end clamp 84 is configured to further secure the position of the rotor blade 20, particularly the root section 22 thereof, relative to the table 42 and the fixture 50.

Figure 14:
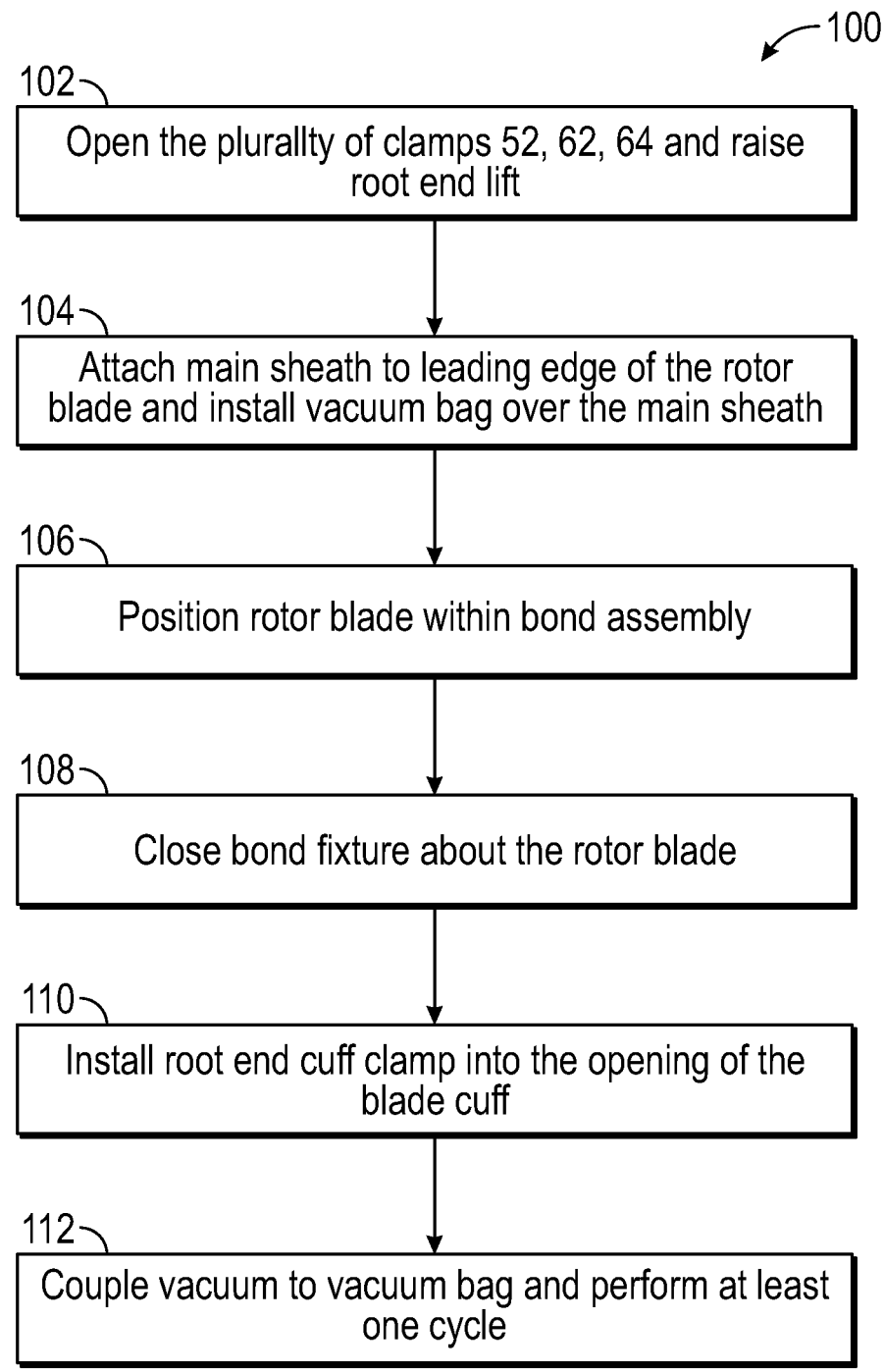
FIG. 14 is a method of bonding a sheath assembly to a leading edge of a rotor blade according to an embodiment.

With reference now to FIG. 14, a method 100 of bonding the sheath assembly to the leading edge 32 of the rotor blade assembly 20 includes opening the plurality of clamps 52, the root end clamp 62, and the tip end clamp 64, and raising the root end lift 80 to an extended position, as shown in block 102. In block 104, the sheath assembly is attached to the rotor blade 20 and a vacuum bag is installed over the entire rotor blade assembly 20. The rotor blade 20 is then inserted into the bond assembly 40, shown in block 106, by positioning the blade cuff 66 into the root end lift 80 and then lowering the root end lift to the retracted position. The remainder of the blade 20 is lowered into a position between the first and second members of the clamps 52, root end clamp 62, and tip end clamp 64. In block 108, after installation of the rotor blade 20, the first and second members of the clamps 52, root end clamp 62, and tip end clamp 64, are pivoted towards the blade 20 to an engaged position and coupling the first and second members with a connector 60, 76. Engaging the fixture 50 about the rotor blade 20 may additionally include moving the contactors 58 associated with the clamps 52 to engage and clamp a corresponding surface of the rotor blade 20. In block 110, the root end clamp 84 is inserted into an opening of the blade cuff 66 and is fastened thereto. A controller (see FIGS. 3 and 4) associated with a vacuum connected to the vacuum bag is then operated, as shown in block 112, to perform at least on cycle to affix the sheath assembly to leading edge 32 of the rotor blade 20. The controller additionally monitors the required vacuum through a vacuum sensing feature. If a vacuum leak propagates during the bond cycle of the sheath assembly an alarm will sound.

The bond assembly 40 illustrated and described herein provides localized heat, positive pressure, and vacuum pressure to a desired area of the rotor blade. The small size of the tool allows the bonding process to be performed in a fixed location without requiring movement to a separate location to cure. As a result, the need for a large walk-in oven to cure components of the blade 20 is eliminated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of bonding a sheath assembly laminate to a rotor blade comprising:
   installing the sheath assembly laminate about the rotor blade;
   mounting the rotor blade within a bond fixture by moving a root end lift vertically between an extended position and a retracted position;
   applying pressure to the sheath assembly laminate installed about the rotor blade; and
   applying localized and constant heat to the sheath assembly laminate installed about the rotor blade.

2. The method according to claim 1, wherein mounting the rotor blade within the bond fixture includes moving a plurality of clamps into engagement with the rotor blade.

3. The method according to claim 2, wherein moving the plurality of clamps includes pivoting a first member and a second member into contact with a surface of the rotor blade.

4. The method according to claim 1, wherein constant pressure is applied to the rotor blade via a vacuum bag.

5. A method of bonding a sheath assembly laminate to a rotor blade comprising:
   installing the sheath assembly laminate about the rotor blade;
   mounting the rotor blade within a bond fixture;
   applying pressure to the sheath assembly laminate; and
   applying localized and constant heat to the sheath assembly laminate;
   wherein mounting the rotor blade within the bond fixture includes moving a plurality of clamps into engagement with the rotor blade;
   wherein moving the plurality of clamps includes pivoting a first member and a second member into contact with a surface of the rotor blade; and
   wherein mounting the rotor blade within the bond fixture includes positioning a root end clamp within a hollow interior of a blade cuff of the rotor blade.

6. A method of bonding a sheath assembly laminate to a rotor blade comprising:
   installing the sheath assembly laminate about the rotor blade;
   mounting the rotor blade within a bond fixture by positioning a root end locating device which connects to a blade cuff of the rotor blade;
   applying pressure to the sheath assembly laminate installed about the rotor blade; and
   applying localized and constant heat to the sheath assembly laminate installed about the rotor blade.

* * * * *